United States Patent
Katzenberger

(10) Patent No.: US 7,602,147 B2
(45) Date of Patent: Oct. 13, 2009

(54) DEVICE, IN PARTICULAR A CHARGER DEVICE

(75) Inventor: Steffen Katzenberger, Bad Liebenzell (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/412,651

(22) Filed: Apr. 27, 2006

(65) Prior Publication Data

US 2006/0244459 A1    Nov. 2, 2006

(30) Foreign Application Priority Data

May 2, 2005    (DE)    .................... 10 2005 020 356

(51) Int. Cl.
*H02J 7/00*    (2006.01)

(52) U.S. Cl. .................. 320/132; 320/133; 320/160; 324/427

(58) Field of Classification Search .................. 320/132, 320/133, 160; 324/427
See application file for complete search history.

(56) References Cited

U.S. PATENT DOCUMENTS

| | | | | |
|---|---|---|---|---|
| 5,321,627 A * | 6/1994 | Reher | ......................... | 702/63 |
| 5,672,951 A * | 9/1997 | Shiota | ........................ | 320/132 |
| 5,717,256 A * | 2/1998 | Okumura et al. | .............. | 307/66 |
| 6,011,380 A * | 1/2000 | Paryani et al. | ............... | 320/132 |
| 6,683,440 B2 * | 1/2004 | Kawakami et al. | .......... | 320/133 |
| 7,096,130 B2 * | 8/2006 | Tashiro et al. | .................. | 702/63 |
| 2003/0184261 A1 * | 10/2003 | Yokoyama | ................... | 320/125 |
| 2004/0121223 A1 * | 6/2004 | Kim | ............................. | 429/61 |
| 2005/0134225 A1 * | 6/2005 | Mese et al. | .................. | 320/132 |

* cited by examiner

*Primary Examiner*—Karl Easthom
*Assistant Examiner*—Samuel Berhanu
(74) *Attorney, Agent, or Firm*—Michael J. Striker

(57) ABSTRACT

The present invention is directed to a device, in particular a charger device, with a measuring unit (10) for acquiring at least one battery characteristic value.

It is provided that the device includes an arithmetic unit (12) which is provided to determine an ageing-specific charging mode as a function, at the least, of the acquired battery characteristic value.

9 Claims, 3 Drawing Sheets

DEVICE, IN PARTICULAR A CHARGER DEVICE

BACKGROUND OF THE INVENTION

The present invention is directed to a device, in particular a charger device, with a measuring unit.

A charger device with a measuring unit is known, the measuring unit being provided to acquire a characteristic value of a battery which is plugged into a charger. This characteristic value serves to determine a state of charge of the battery, which can then be used to select a charging procedure for the battery. The charging procedure is carried out independently of the ageing of the battery.

SUMMARY OF THE INVENTION

The present invention is directed to a device, in particular a charger device, with a measuring unit for acquiring at least one battery characteristic value.

It is provided that the device includes an arithmetic unit, which is used to determine an ageing-specific charging mode, as a function, at the least, of the acquired battery characteristic value. In this context, the term "provided" is intended to mean, in particular, "equipped", "designed" and/or "programmed". "Battery characteristic value" should be understood to mean, in particular, an electrical characteristic value of the battery, in particular a voltage, a charge, a capacitance, and/or a resistance. In this context, a "battery" should be understood to mean a rechargeable energy storage unit.

Using a suitable embodiment according to the present invention, a charging process of a battery can be attained that can be carried out specifically with regard for an ageing of the battery. Charging processes can be attained, for example, that can be carried out in a manner that is easy on the charging current supply unit; this is accomplished by the fact that the charging current supply unit outputs a charging current that is adapted to an extent of ageing of the battery.

The determination of the charging mode can take place in one or more steps, e.g., by determining an extent of ageing at least as a function of the acquired battery characteristic value and subsequently determining a charging mode based on the extent of ageing.

The arithmetic unit is preferably provided to determine a state characteristic value of a battery. In this context, a "state characteristic value" should be understood to mean, in particular, a battery characteristic value, the variation of which is monotonous, in particular with a number of charging-discharging cycles, and which is characterized by the number of charging-discharging cycles in particular. For example, an internal resistance, a capacitance, a state of charge at a predetermined time in a charging-discharging cycle, and/or further battery characteristic values appearing reasonable to one skilled in the art can be determined. A determined state characteristic value can be used advantageously in the determination of the ageing-specific charging mode, since this state characteristic value can reflect an ageing of the battery in a meaningful manner.

It is also provided that the arithmetic unit is provided to determine an internal resistance characteristic value of a battery. As a result, a characteristic value that provides particularly meaningful information about an ageing of the battery can be acquired. Furthermore, the internal resistance characteristic value is particularly easy to determine, e.g., based on at least one voltage and current characteristic value, using Ohm's law.

In a further embodiment of the present invention, the arithmetic unit is provided to assign a charging mode to a plurality of battery characteristic values. Ease of use can be increased by the fact that an easy-to-understand selection of charging modes can be attained. A plurality of battery characteristic values can be assigned to one class. A class can be formed, e.g., by battery characteristic values in a specified interval or above a specified minimum value and below a specified maximum value. It is also feasible to classify the battery characteristic values using a classification model based on a fuzzy logic classification and/or a K-nearest neighbor classification.

The device preferably includes a memory unit in which data are stored, the data serving to determine the ageing-specific charging mode. A rapid and effective determination of the ageing-specific charging mode can be attained by allowing the arithmetic unit to access these stored data. Data in a characteristic map can be stored in the memory unit, it being possible for the characteristic map to serve to assign a charging mode to a certain battery characteristic value and/or a class of battery characteristic values.

The device advantageously includes an output device for outputting at least one characteristic value, which is a function of an extent of ageing. As a result, an operator can be informed of the extent of ageing of a battery. A charging mode determined by an arithmetic unit can be checked, and/or it can be determined that a battery is unusable. As a result, the undesirable situation in which unusable batteries are left in a charger, e.g., during a charging process, is prevented, thereby also preventing a loss of time and money.

It is also provided that the device includes a setting unit, which is provided for setting an ageing-specific charging mode of a charging current supply unit. An interface between the arithmetic unit and a charging current supply unit can be attained, e.g., by a charger, and flexibility of use can be attained. This setting can be carried out fully automatically by the fact that charging mode determined by the arithmetic unit is set automatically in the charging current supply unit. As an alternative and/or in addition, the charging mode can be set manually by an operator using an input device, the operator being informed, e.g., about the charging mode that was determined. As a result, the operator is able to control the final selection of the charging mode. For example, the operator can select between various preprogrammed charging modes, whereby the parameters, e.g., a charging current and/or a charging time, of this mode are predetermined, or the operator can enter these parameters himself, e.g., by setting the charging current manually.

BRIEF DESCRIPTION OF THE DRAWINGS

Further advantages result from the description of the drawing, below. An exemplary embodiment of the present invention is shown in the drawing. The drawing, the description and the claims contain numerous features in combination. One skilled in the art will also advantageously consider the features individually and combine them to form further reasonable combinations.

DETAILED DESCRIPTION OF THE EXEMPLARY EMBODIMENTS

Figure 1:
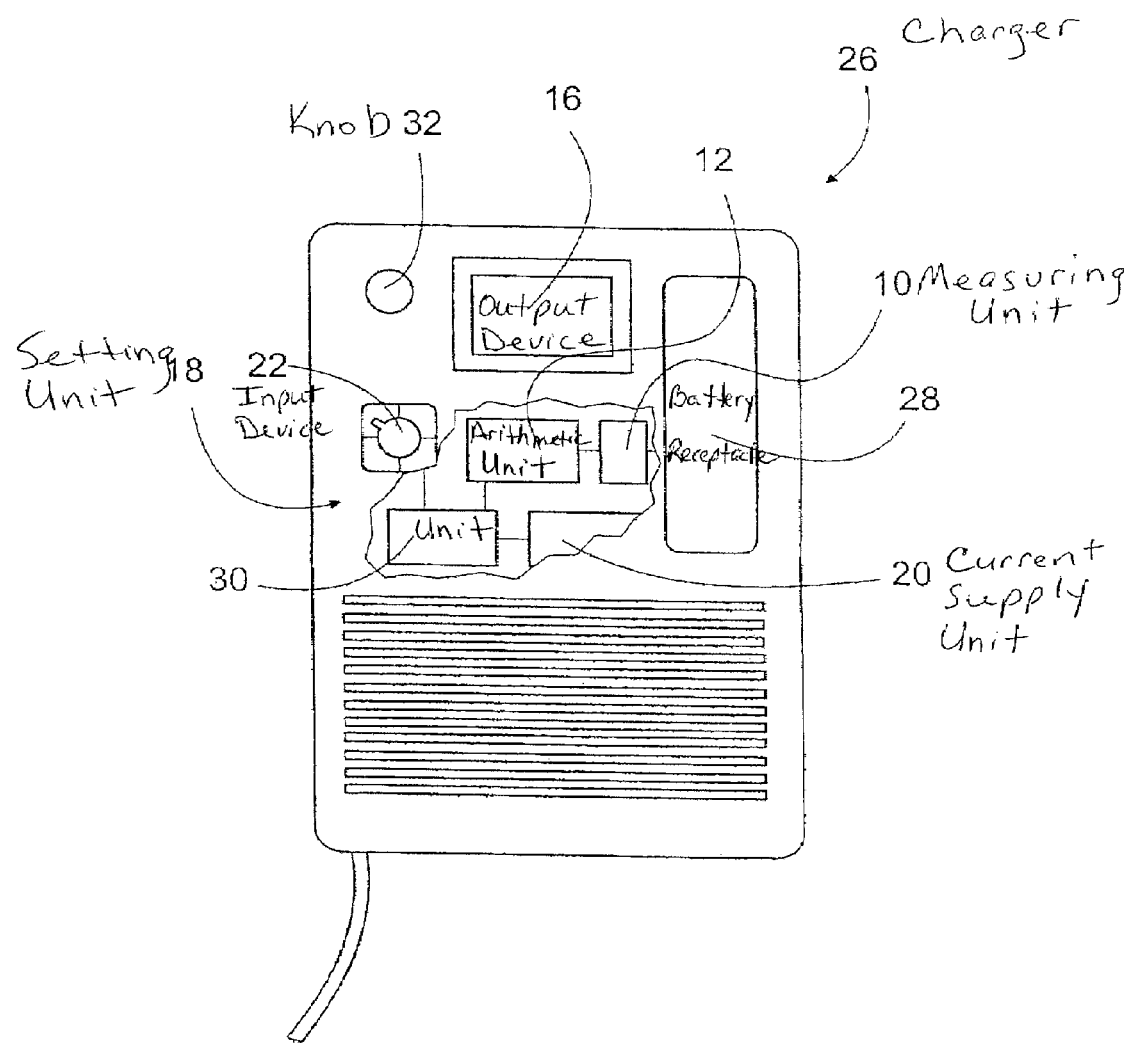
FIG. 1 shows a view of a charger, from above, with a charger device.

FIG. 1 shows a charger 26 with a battery receptacle 28, into which a battery—which is not shown in the figure—can be plugged. Charger 26 has a charger device that includes a measuring unit 10, an arithmetic unit 12 and a setting unit 18. Setting unit 18 includes a unit 30 and an input device 22 that has an operating element formed by a rotary knob. Charger 26 also includes a charging current supply unit 20, a knob 32 and an output device 16 configured as an LED display.

Figure 2:
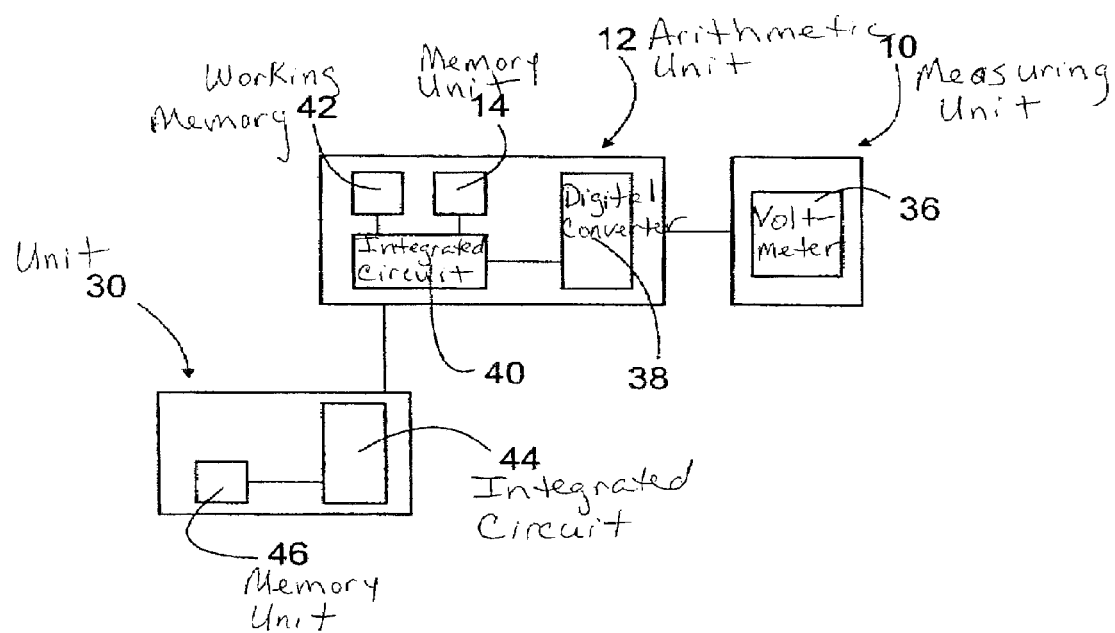
FIG. 2 shows a schematic depiction of the layout of internal circuits of the charger in FIG. 1.

FIG. 2 is a detailed, schematic view of measuring unit 10, arithmetic unit 12 and unit 30.

Figure 3:
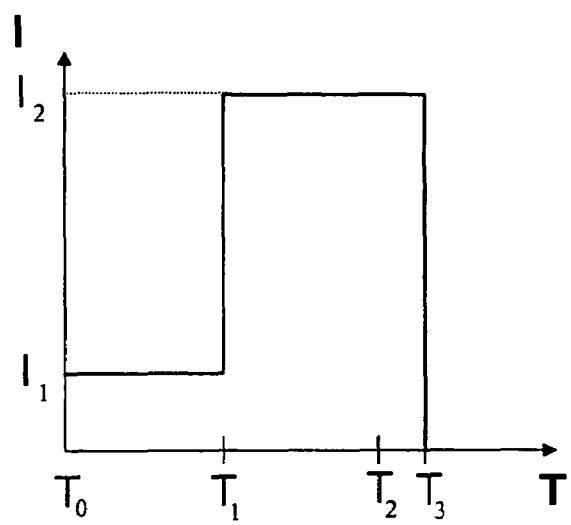
FIG. 3 is a graph of current with respect to time during a measurement procedure of an internal resistance.

Before a charging process of a battery is carried out in charger 26, battery characteristic values are acquired by measuring unit 10. The graph of this measurement process is shown in FIG. 3. In a first step, current $I_1$ provided by charging current supply unit 20 flows into the battery from point in time $T_0$ to a point in time $T_1$. Starting at point in time $T_1$, a current $I_2$ is supplied by charging current supply unit 20 until point in time $T_3$. At points in time $T_1$ and $T_2$, a voltage $V_1$ and $V_2$, respectively, between the poles of the battery is measured by a voltmeter 36. These measured voltage characteristic values $V_1$ and $V_2$, and current intensities $I_1$ and $I_2$ are transmitted to arithmetic unit 12. An analog-digital converter 38 of arithmetic unit 12 converts the characteristic values into digital data, which are stored in a working memory 42 by an integrated circuit 40. Integrated circuit 40 is programmed to calculate, based on the battery characteristic values stored, internal resistance $R_{DC}$ of the battery using the formula $$R_{DC} = (V_1 - V_2)/(I_2 - I_1)$$

In the determination of internal resistance $R_{DC}$ in two measurement steps with two different current intensities, it is possible to advantageously eliminate unknown characteristic values. These unknown variables are associated with effects, for example, that are due to passivation layers of the battery. To increase the precision of internal resistance $R_{DC}$ that is determined, the battery characteristic values can be acquired at additional detection times $T_i$ and stored in working memory 42. Integrated circuit 40 is programmed to calculate means of stored battery characteristic values $V_i$ and $I_i$, via which internal resistance $R_{DC}$ can be determined.

It is also feasible that currents $I_1$ and $I_2$ can be supplied by the battery. A quantity of residual energy in the battery can be utilized for this purpose. It is also basically feasible to briefly charge the battery so that, at the least, a quantity of current required for the measurement process can be subsequently given off. A discharge switch is also required in order to switch from current intensity $I_1$ to current intensity $I_2$.

Based on internal resistance $R_{DC}$ that was determined, data stored in a memory unit 14 are used by integrated circuit 40 to determine an extent of ageing of the battery and an ageing-specific charging mode. The extent of ageing is output by output device 16 in percentage form and in the form of an ageing class. The ideal percentage, "100%" corresponds, e.g., to a new state of a battery, while the percentage "0%" corresponds to a battery that should be considered unusable. An ageing class of the battery is assigned to a certain interval of internal resistance $R_{DC}$. When internal resistances $R_{DC}$ are low, in an interval $[R_1, R_2]$, the battery is assigned to a "new" ageing class. When resistances are moderate, in an interval $[R_2, R3]$, the battery is assigned to a "moderate" ageing class and, when resistance is high, in an interval $[R_3, R_4]$, the battery is assigned to the "unusable" ageing class. It is also feasible to carry out classification using a classification model based on a fuzzy logic classification and/or a K-nearest neighbor classification. The charging mode that is determined is also characterized by a charging current and a charging time. These characteristic values are also output by output device 16.

The rotary knob of input device 22 can be positioned at four different positions. One of these positions corresponds to a fully automatic mode, the characteristic values of the loading mode calculated by arithmetic unit 12 being transmitted to unit 30 of setting unit 18. An integrated circuit 44 of unit 30 is programmed to start a charging process with these characteristic values, the charging current being subsequently supplied during the charging time by charging current supply unit 20.

As an alternative, the operator can select the charging mode himself. To do this, he can position the rotary knob in three certain positions, each of which corresponds to one of the ageing classes. Once the operator has made his selection, he can press knob 32 to start the charging process. Parameters for the charging mode selected by the operator are read by integrated circuit 44 in a memory unit 46, the charging process is started by integrated circuit 44 and is carried out in accordance with these parameters.

Figure 4:
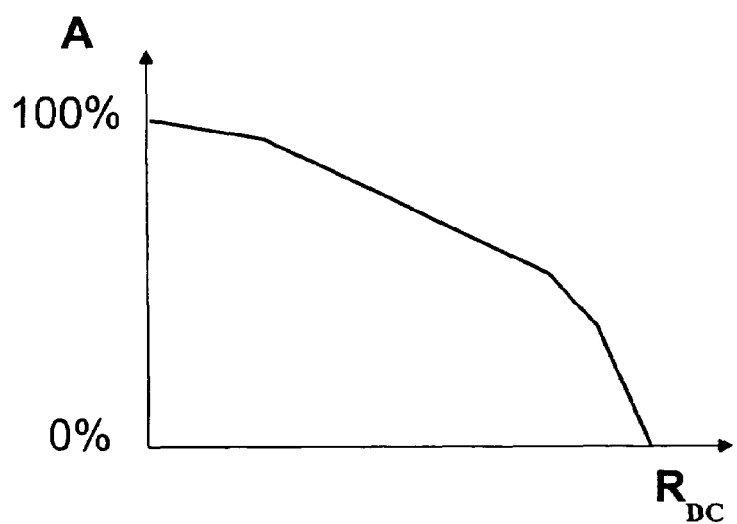
FIG. 4 shows a characteristic map curve of an extent of ageing with respect to the internal resistance.

FIG. 4 shows a characteristic map curve, which serves to determine the extent of ageing of the battery. A model is shown, a percentage which characterizes an extent of ageing A on the y-axis being assigned to a value of internal resistance $R_{DC}$ on the x-axis. Numerical data of the model are stored in memory unit 14 and are available for access by integrated circuit 40.

Figure 5:
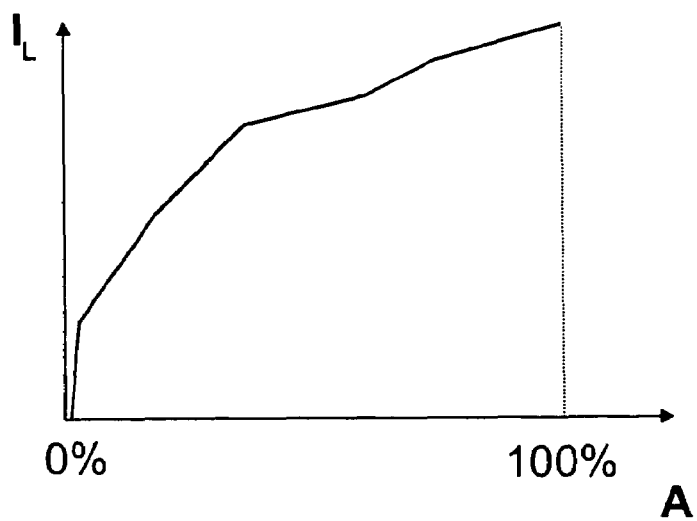
FIG. 5 shows a characteristic map curve of a charging current with respect to the extent of ageing.

FIG. 5 shows a charging current model that serves to assign the charging mode to the extent of ageing. A value of charging current $I_L$ for a charging process on the y-axis is assigned to a percentage of extent of ageing A on the x-axis. Numerical data of the model are also stored in memory unit 14, and are read by integrated circuit 40 in the determination of the charging mode.

REFERENCE NUMERALS

10 Measuring unit
12 Arithmetic unit
14 Memory unit
16 Output device
18 Setting unit
20 Charging current supply unit
22 Input device
26 Charger
28 Battery receptacle
30 Unit
32 Button
36 Voltmeter
38 Analog-digital converter
40 Integrated circuit
42 Working memory
44 Integrated circuit
46 Memory unit
$T_0$ Point in time
$T_1$ Point in time
$T_2$ Point in time
$T_3$ Point in time
$T_i$ Point in time
$I_1$ Current
$I_2$ Current
$I_L$ Charging current
$I_i$ Current $V_L$ Voltage
$V_2$ Voltage
$V_i$ Voltage
$R_{DC}$ Internal resistance
A Extent of ageing

What is claimed is:

1. A device, comprising:
    a measuring unit (10) configured to acquire at least one battery characteristic value,
    an arithmetic unit (12), wherein said arithmetic unit (12) is configured to determine an ageing-specific charging mode before a charging process of a battery is carried out as a function, at the least, of the at least one battery characteristic value acquired by the measuring unit,
    wherein said arithmetic unit is configured to determine a state characteristic value based on said at least one battery characteristic value acquired by the measuring unit,
    wherein said state characteristic value is characterized by a number of charging-discharging cycles of the battery,
    wherein said arithmetic unit is further configured to determine an extent of ageing of said battery based on said state characteristic value, and
    wherein said arithmetic unit is further configured to determine said ageing-specific charging mode based on the extent of ageing of said battery.

2. The device as recited claim 1, wherein the arithmetic unit (12) is cofigured to determine an internal resistance characteristic value of the battery.

3. The device as recited in claim 1, wherein the arithmetic unit (12) is configured to assign a charging mode to a plurality of battery characteristic values.

4. The device as recited in claim 1, further comprising a memory unit (14) in which data are stored, the data serving to determine the ageing-specific charging mode.

5. The device as recited in claim 1, further comprising an output device (16) for outputting at least one characteristic value, which is a function of an extent of ageing.

6. The device as recited in claim 1, further comprising a setting unit (18) for setting an ageing-specific charging mode of a charging current supply unit (20).

7. The device as recited in claim 1, further comprising an input device (22) for the manual input of the charging mode.

8. A charger, comprising:
    a device, said device comprising a measuring unit (10) configured to acquire at least one battery characteristic value, and
    an arithmetic unit (12), wherein said arithmetic unit (12) is configured to determine an ageing-specific charging mode before a charging process of a battery is carried out as a function, at the least, of the at least one battery characteristic value acquired by the measuring unit, wherein said arithmetic unit is configured to determine a state characteristic value based on said at least one battery characteristic value acquired by the measuring unit, wherein said state characteristic value is characterized by a number of charging-discharging cycles of the battery, wherein said arithmetic unit is further configured to determine an extent of ageing of said battery based on said state characteristic value, and wherein said arithmetic unit is further configured to determine said ageing-specific charging mode based on the extent of ageing of said battery.

9. A method for determining an ageing-specific charging mode of a battery as a function of an acquired battery characteristic value, comprising the following steps:
    providing a device, said device comprising a measuring unit (10) and arithmetic unit;
    acquiring at least one battery characteristic value by the measuring unit;
    determining a state characteristic value by the arithmetic unit based on said at least one battery characteristic value acquired by the measuring unit, wherein said state characteristic value is characterized by a number of charging-discharging cycles of the battery;
    determining an extent of ageing of the battery to be charged by the arithmetic unit based on the state characteristic value; and
    determining an ageing-specific charging mode for the battery to be charged by the arithmetic unit based on the extent of ageing of said battery determined by said arithmetic unit.

* * * * *